US012756220B2

(12) United States Patent
Chen

(10) Patent No.: US 12,756,220 B2
(45) Date of Patent: Oct. 6, 2026

(54) CHARGING METHOD, ELECTRONIC EQUIPMENT, NON-TRANSITORY READABLE STORAGE MEDIUM BY USING AT LEAST TWO CHARGING PATHS TO CHARGE A BATTERY

(71) Applicant: Beijing Xiaomi Mobile Software Co., Ltd., Beijing (CN)

(72) Inventor: Yichun Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 1048 days.

(21) Appl. No.: 17/874,083

(22) Filed: Jul. 26, 2022

(65) Prior Publication Data

US 2023/0261497 A1 Aug. 17, 2023

(30) Foreign Application Priority Data

Feb. 16, 2022 (CN) ......................... 202210142660.8

(51) Int. Cl.

*H02J 7/00* (2026.01)
*G01K 7/00* (2006.01)
*H02J 7/90* (2026.01)
*H02J 7/94* (2026.01)

(52) U.S. Cl.

CPC .................. *H02J 7/94* (2026.01); *G01K 7/00* (2013.01); *H02J 7/975* (2026.01); *G01K 2213/00* (2013.01)

(58) Field of Classification Search

CPC ................................................... H02J 7/00714
USPC .......................................................... 320/152
See application file for complete search history.

(56) References Cited

U.S. PATENT DOCUMENTS

2012/0112705 A1* 5/2012 Wang ........................ H02J 7/00 320/152
2013/0293186 A1* 11/2013 Chou ................ H02J 7/007194 320/107
2020/0044458 A1 2/2020 Yoon et al.

(Continued)

FOREIGN PATENT DOCUMENTS

CN 105098895 A 11/2015
CN 204947665 U 1/2016
CN 105322597 A 2/2016

(Continued)

OTHER PUBLICATIONS

Chinese Office Action mailed on Mar. 14, 2024 in corresponding Chinese Patent Application No. 202210142660.8 (with partial English translation and English Translation of Category of Cited Documents), 8 pages.

(Continued)

*Primary Examiner* — Yalkew Fantu

(74) *Attorney, Agent, or Firm* — Oblon, McClelland, Maier & Neustadt, L.L.P.

(57) ABSTRACT

A charging method includes: obtaining a temperature value corresponding to each of the at least two charging paths; obtaining a current coefficient for determining a branch current of each charging path, based on the temperature value corresponding to each charging path; determining a branch current in each charging path based on the current coefficient and a total charging current of an electronic equipment; controlling each charging path to charge the battery correspondingly based on the branch current of each charging path.

17 Claims, 6 Drawing Sheets

(56) References Cited

U.S. PATENT DOCUMENTS

| | | | | |
|---|---|---|---|---|
| 2021/0218263 A1* | 7/2021 | Sun | H01M 10/443 | |
| 2022/0140621 A1* | 5/2022 | Kwon | H02J 7/0018 | 320/117 |

FOREIGN PATENT DOCUMENTS

| | | |
|---|---|---|
| CN | 106451621 A | 2/2017 |
| CN | 106532812 A | 3/2017 |
| CN | 107302245 A | 10/2017 |
| CN | 108365657 A | 8/2018 |
| CN | 108682672 A | 10/2018 |
| CN | 106712216 B | 7/2019 |
| CN | 112737022 A | 4/2021 |

OTHER PUBLICATIONS

Li. Taofeng, "Research and design of monolithic linear Li-ion battery charger IC with intelligent thermal regulation,", Chinese Masters Theses Full-text Database, Mar. 15, 2007, 81 pages.

Extended European Search Report issued Jun. 21, 2023, in corresponding European Patent Application No. 22190957.5, 9 pages.

* cited by examiner

CHARGING METHOD, ELECTRONIC EQUIPMENT, NON-TRANSITORY READABLE STORAGE MEDIUM BY USING AT LEAST TWO CHARGING PATHS TO CHARGE A BATTERY

CROSS-REFERENCE TO RELATED APPLICATIONS

The present application claims the benefit of priority to Chinese Application No. 202210142660.8 filed on Feb. 16, 2022, the contents of which are incorporated herein by reference in their entirety.

BACKGROUND OF THE INVENTION

Field of the Invention

The present disclosure relates to the field of charging technology, and in particular, to a charging method and device, an electronic equipment, and a non-transitory readable storage medium.

Description of the Related Art

With the rapid development of charging technology, fast charging technology is adopted in more and more electronic equipment. The existing fast charging technology generally improves the charging efficiency by increasing the charging voltage and/or charging current, that is improving the charging function.

SUMMARY OF THE INVENTION

The present disclosure provides a charging method, an electronic equipment, and a non-transitory readable storage medium.

According to a first aspect of the embodiments of the present disclosure, provided is a charging method applied to an electronic equipment provided with at least two charging paths to charge a battery, including: obtaining a temperature value corresponding to each of the at least two charging paths;

- obtaining a current coefficient based on the temperature value corresponding to each charging path;
- determining a branch current in each charging path based on the current coefficient and a total charging current of the electronic equipment;
- controlling each charging path to charge the battery correspondingly based on the branch current of each charging path.

According to a second aspect of the embodiments of the present disclosure, provided is an electronic equipment including a memory and a processor;

- the memory is configured to store computer programs executable by the processor;
- the processor is configured to execute the computer programs stored in the memory to implement the above methods.

According to a third aspect of the embodiments of the present disclosure, provided is a non-transitory computer readable storage medium, wherein, in the condition that the executable computer programs in the storage medium are executed by a processor, the above methods am implemented.

It should be understood that the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this description, illustrate embodiments consistent with the disclosure and together with the description serve to explain the principles of the disclosure.

DETAILED DESCRIPTION OF THE PREFERRED EMBODIMENTS

Figure 1:
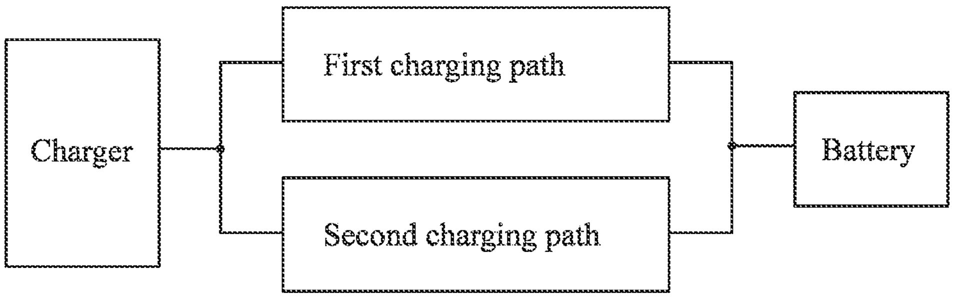
FIG. 1 is an architectural schematic diagram of a charging path according to an embodiment.

Exemplary embodiments will be described in detail here, and examples thereof are shown in the drawings. When the following description relates to the drawings, unless otherwise indicated, the same numbers in different drawings represent the same or similar elements. The exemplary embodiments described in the following do not represent all embodiments consistent with the present disclosure. Instead, they are merely examples of devices consistent with some aspects of the present disclosure as detailed in the appended claims. It should be noted that the features in the following embodiments and implementation manners can be combined with each other without conflict.

With the rapid development of charging technology, fast charging technology is adopted in more and more electronic equipment. The existing fast charging technology generally improves the charging efficiency by increasing the charging voltage and/or charging current, that is improving the charging function. It should be understood that the temperature of the electronic equipment also rises rapidly in the process of high-power charging, which causes the electronic equipment to start the thermal protection, thus restricting the improvement of the charging power.

In practical application, the existing electronic equipment is usually provided with two charging paths to charge the battery. The above two charging paths are usually arranged at different positions. For example, one charging path is close to the processor of the electronic equipment and the other is close to the radiator. Thus, the heat dissipation speed of the two charging paths is different from each other, so the temperature rise of the two charging paths is different from each other, resulting in uneven heating of the two charging paths and reducing the charging efficiency.

To solve the above technical problems, the embodiment of the present disclosure provides a charging method, which can be applied to an electronic equipment provided with at least two charging paths to charge a battery, where, the at least two charging paths are connected in parallel. In the subsequent embodiments of the present disclosure, two charging paths, a first charging path and a second charging path, are described as examples, and the connection mode is shown in FIG. 1. The inventive concept of the present disclosure is that, a current coefficient for determining the branch current of each charging path is determined based on the temperature values of the at least two charging paths, then the branch current of each charging path is determined based on the current coefficient, and finally the battery is charged based on the determined branch current. Taking two charging paths as an example, a total thermal model of the electronic equipment is obtained in the present disclosure based on the obtained temperature values of the two charging paths combined with the Joule law; then, the branch current of each charging path is calculated when the total generating capacity of heat of the electronic equipment is the minimum; after that, each charging path is controlled to charge the battery based on the branch current. In this way, the generating capacity of heat of the two charging paths in the charging process, that is, the heat produced by the electronic equipment in the charging state, is the smallest. In other words, in the present disclosure the two charging paths are enabled to achieve balanced heating, the problem of decreasing of the charging power decreases due to the high temperature of the charging path being limited by the temperature protection is avoided, so as to ensure that the battery is in a high-power charging state, which is conducive to improving the charging efficiency.

It should be noted that the first charging path refers to the path through which a current is transmitted from the charging interface of the electronic equipment to the battery. The path may include but not limited to filters, rectifiers, inverters and other devices. The devices included in the path may be arranged according to specific scenarios, which is not limited here. The arrangement manner of the second charging path is similar to that of the first charging path, and will not be repeated here.

Figure 2:
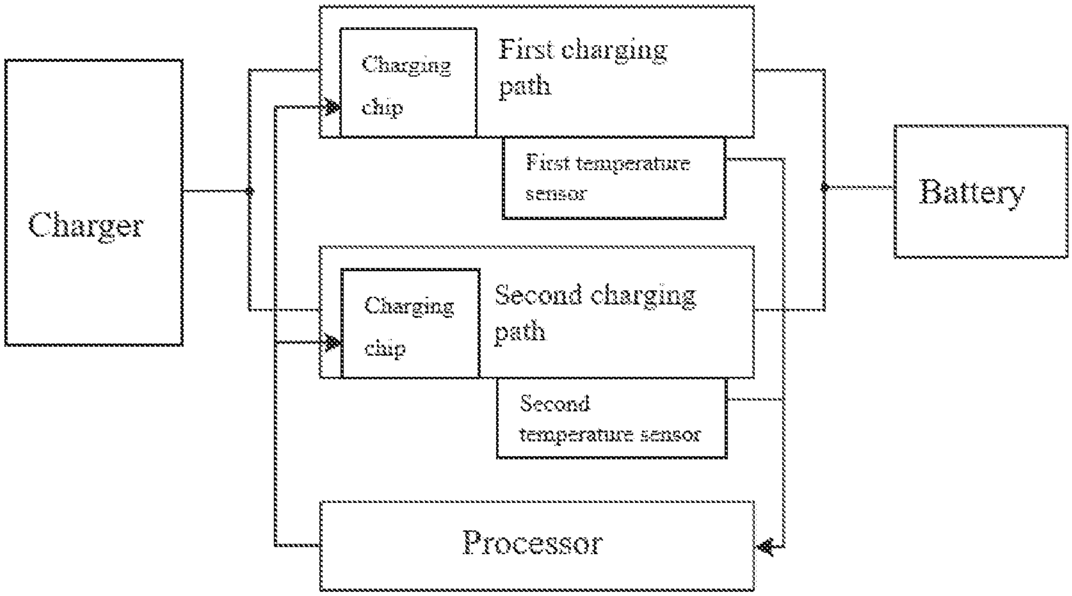
FIG. 2 is an architectural schematic diagram of another charging path according to an embodiment.

In order to collect real-time temperature values of the two charging paths, the electronic equipment in the present embodiment also includes a temperature sensor and a second temperature sensor, which can be implemented as temperature sensors in the related technology. As shown in FIG. 2, the first temperature sensor is arranged within a preset range of the first charging path to collect a first temperature value corresponding to the first charging path. The second temperature sensor is arranged within a preset range of the second charging path to collect a second temperature value corresponding to the second charging path. It should be noted that the temperature values collected by the first temperature sensor and the second temperature sensor may be stored in a specified location, which may include but not limited to local memory, cache or cloud, and may also be directly sent to the processor of the electronic equipment, which is not limited here.

Figure 3:
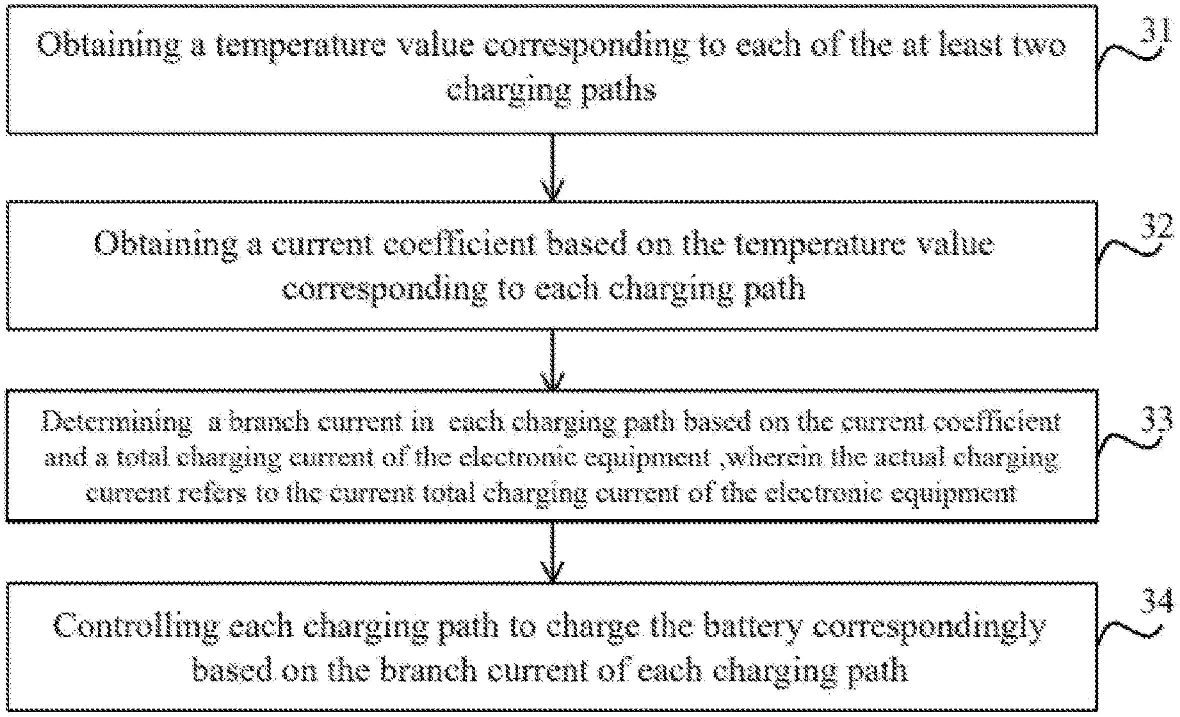
FIG. 3 is a flowchart of a charging method according to an embodiment.

FIG. 3 is a flowchart of a charging method according to an exemplary embodiment. Referring to FIG. 3, a charging method includes steps 31 to 34.

In step 31, a temperature value corresponding to each of the at least two charging paths is obtained.

Continuing to take the two charging paths as an example, the processor in the electronic equipment may acquire a first temperature value corresponding to the first charging path and a second temperature value corresponding to the second charging path according to a preset cycle. Considering that the first temperature sensor may store the real-time collected temperature value into the specified location, the processor may read the temperature value from the specified location, which is later called the first temperature value in order to be distinguished. Or considering that the first temperature sensor may directly send the collected temperature value to the processor, at this time, the processor may directly obtain the temperature value, that is, the first temperature value. The method of obtaining the second temperature value by the processor may refer to that of obtaining the first temperature value, which will not be repeated here.

In step 32, a current coefficient is obtained based on the temperature value corresponding to each charging path, where the current coefficient is configured to determine a branch current of each charging path.

Figure 4:
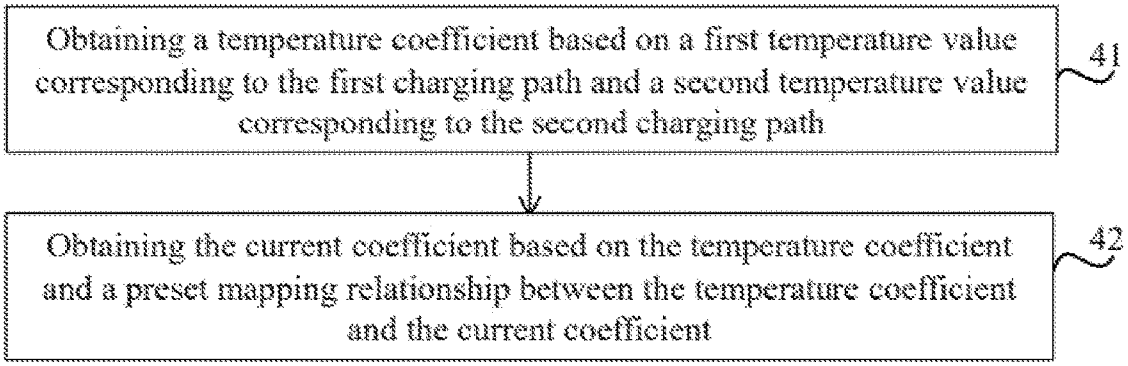
FIG. 4 is a flowchart of obtaining a current coefficient according to an embodiment.

In the present embodiment, the processor in the electronic equipment may obtain the current coefficient based on the first temperature value and the second temperature value, which includes steps 41 to 42, referring to FIG. 4.

In step 41, the processor may obtain a temperature coefficient based on the first temperature value corresponding to the first charging path and the second temperature value corresponding to the second charging path. The temperature coefficient represents the proportional value of the first temperature value and the second temperature value. Before the temperature coefficient is set, it is assumed that a heat quantity generated by the first charging path is Q1, and a heat quantity generated by the second charging path is Q2. After the temperature coefficient is set, assuming that the temperature coefficient is G, the heat quantity of the second charging path is still Q2, then the heat quantity of the first charging path turns to G*Q1.

It should be noted that in the process of using electronic equipment, the user is sensitive to temperature but not heat quantity, so the temperature coefficient is set in this step, that is, the first meaning of the temperature coefficient G represents the proportional value of the first temperature value and the second temperature value. Considering that the heat dissipation allowance of the charging path is smaller when the temperature of the charging path is higher, or that the charging path generates more heat and emits more heat when the temperature of the charging path is higher, the heat dissipation allowance of the charging path should be reduced to make the heat dissipation allowance smaller, so the heat dissipation allowance of the charging path with higher temperature is smaller. Therefore, in this step, it may be more sensitive to the one with a higher temperature of the first charging path and the second charging path by setting the temperature coefficient, that is, the heat generated by the charging path may be adjusted by adjusting the temperature coefficient to make full use of the heat dissipation space. For example, when the temperature coefficient is larger, the temperature of the first charging path is higher, while the temperature of the second charging path is lower. At this time, the heat dissipation allowance of the first charging path is smaller, while the heat dissipation allowance of the second charging path is larger. When the temperature coefficient is smaller, the temperature of the first charging path is lower, while the temperature of the second charging path is higher. At this time, the heat dissipation allowance of the first charging path is larger, while the heat dissipation allowance of the second charging path is smaller. Therefore, the second meaning of the temperature coefficient G may represent the proportional value of the heat dissipation allowance corresponding to the second charging path and the first charging path. In addition, by setting the temperature coefficient in this step, it is possible to control the charging path with a larger charging current when the heat is increased, or with a smaller charging current when the heat is reduced in the subsequent process, that is, to control the heat generated by the charging path by adjusting the charging current in the charging path.

In step 42, the processor may obtain the current coefficient based on the temperature coefficient and a preset mapping relationship between the preset temperature coefficient and the current coefficient. In this step, the preset mapping relationship between the temperature coefficient and the current coefficient may be stored in the electronic equipment. The mapping relationship may be may be implemented as a function expression, or a table containing the one-to-one mapping of the temperature coefficient and the current coefficient, which can be selected according to the specific scene. In an example, the above preset mapping relationship between the temperature coefficient and the current coefficient may be expressed by the following expression:

$$K = \frac{1}{GP} \tag{1}$$

In expression (1), G represents the temperature coefficient, K represents the current coefficient, P represents a ratio of $R_1$ and $R_2$, wherein, $R_1$ and $R_2$ represent a first impedance value of the first charging path and a second impedance value of the second charging path, respectively.

It should be understood that after obtaining the temperature coefficient, the processor may substitute the above temperature coefficient into expression (1) to obtain the current coefficient K.

Figure 5:
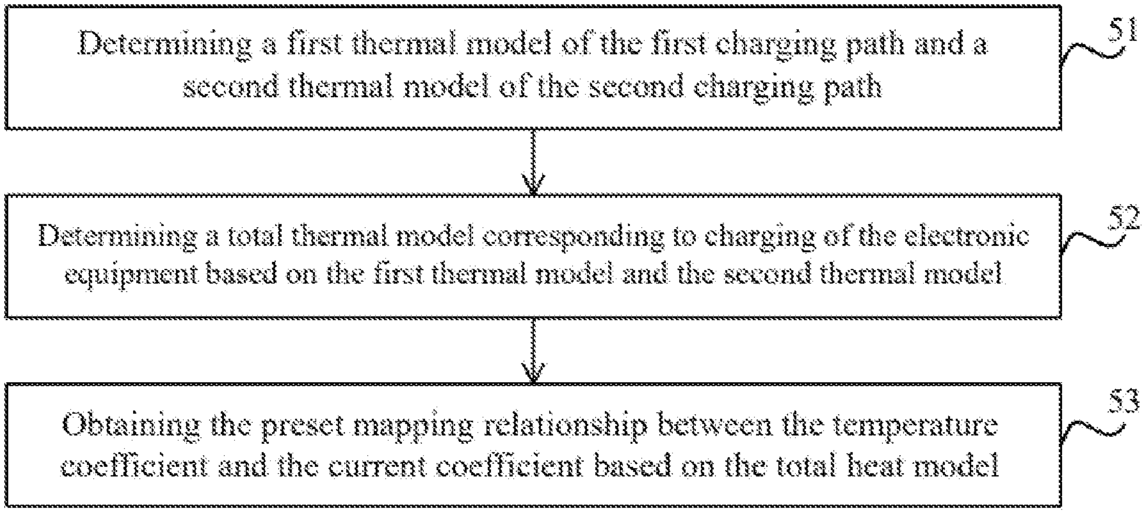
FIG. 5 is a flowchart of obtaining a mapping relationship between a temperature coefficient and a current coefficient according to an embodiment.

In an embodiment, referring to FIG. 5, the above-mentioned method for obtaining the preset mapping relationship between the temperature coefficient and the current coefficient includes steps 51 to 53.

In step 51, the processor may determine a first thermal model of the first charging path and a second thermal model of the second charging path. For example, the processor may obtain a first impedance value of the first charging path and a second impedance value of the second charging path. In the present disclosure, the above impedance values may be detected in advance and regarded as a constant value to simplify the calculation. Then, the processor may determine a first current of the first charging path and a second current of the second charging path based on the total charging current of the electronic equipment. Considering that the mapping relationship rather than the thermal model is used when the charging method provided by the present disclosure is executed, the first current and the second current may not need to be measured in real time or may not need to be measured, so the first current and the second current are used here to be distinguished from the subsequent branch currents.

Then, the processor may determine a first thermal model of the first charging path based on the above temperature coefficient, the first impedance value and the first current. The first thermal model of the first charging path is:

$$Q_1 = G^* R_1^* \left(\frac{K}{K+1} I\right)^2 \tag{2}$$

In expression (2), G represents the temperature coefficient, K represents the current coefficient, R1 represents the first impedance value of the first charging path, I represents the charging current of the battery, Q1 represents the heat generated by the first charging path, and "*" represents multiplication.

The processor may determine a second thermal model of the second charging path based on the second impedance value and the second current. The second thermal model of the second charging is:

$$Q_2 = R_2^* \left(\frac{1}{K+1} I\right)^2 \tag{3}$$

In expression (3), G represents the temperature coefficient, K represents the current coefficient, R2 represents the second impedance value of the second charging path, I represents the charging current of the battery, and Q2 represents the heat generated by the second charging path.

In step 52, the processor may determine a total thermal model corresponding to the charging of the electronic equipment based on the first thermal model and the second thermal model.

In this step, the total thermal model is:

$$Q = G\left(\frac{K}{K+1} I\right)^2 * R_1 + \left(\frac{1}{K+1} I\right)^2 * R_2 \tag{4}$$

Therefore, the total thermal model is equal to the first thermal model plus the second thermal model.

In step 53, the processor may obtain a preset mapping relationship between the temperature coefficient and the current coefficient based on the total thermal model. The derivation process in combination with expression (4) is as follows:

$$\begin{aligned} Q = G\left(\frac{K}{K+1} I\right)^2 * R_1 + \left(\frac{1}{K+1} I\right)^2 * R_2 &= \\ R_2 = G\left(\frac{K}{K+1} I\right)^2 * \frac{R_1}{R_2} + \left(\frac{1}{K+1} I\right)^2 \Bigg] &= \\ R_2\left[GP\left(\frac{K}{K+1} I\right)^2 + \left(\frac{1}{K+1} I\right)^2\right] = R_2 \frac{GPK^2 I^2 + I^2}{(K+1)^2} &= \\ R_2 GPI^2 \frac{K^2 + \frac{1}{GP}}{(K+1)^2} = R_2 GPI^2 \frac{K^2 + 2K - 1 - 2K + 2 + \frac{1}{GP}}{(K+1)^2} &= \\ R_2 GPI^2 \frac{(K+1)^2 - 1 - 2K + \frac{1}{GP}}{(K+1)^2} &= \\ R_2 GPI^2 \left[1 - \frac{2K + 1 - \frac{1}{GP}}{(K+1)^2}\right] = 2R_2 GPI^2 \left[\frac{1}{2} - \frac{K + \frac{1}{2} - \frac{1}{2GP}}{(K+1)^2}\right] & \end{aligned} \tag{5}$$

Assuming the $$t = K + \frac{1}{2} - \frac{1}{2GP}, \text{ then, } K + 1 = t + \frac{GP+1}{2GP}, \tag{6}$$

which is substituted in the above (5) to obtain the follows:

$$Q = 2R_2GPI^2\left[\frac{1}{2} - \frac{t}{t^2 + \frac{GP+1}{GP}t + \left(\frac{GP+1}{2GP}\right)^2}\right] = 2R_2GPI^2\left[\frac{1}{2} - \frac{1}{t + \frac{GP+1}{GP} + \frac{\left(\frac{GP+1}{2GP}\right)^2}{t}}\right] \quad (7)$$

According to expression (7), when $$t = \frac{\left(\frac{GP+1}{2GP}\right)^2}{t},$$

expression (7) may obtain a minimum value, and then $$t = \frac{GP+1}{2GP}. \quad (8)$$

Expression (1) may be obtained by combining expression (6) with expression (8).

That is, in this step, the processor determines the minimum thermal value of the electronic equipment in the charging state based on the total thermal model, and determines the preset mapping relationship between the temperature coefficient and the current coefficient based on the minimum thermal value t (i.e., expression (1)).

In step 33, a branch current in each charging path is determined based on the current coefficient and the total charging current of the electronic equipment.

In this embodiment, the processor in the electronic equipment may determine the total charging current of the electronic equipment. For example, the processor may communicate with the charger outside the electronic equipment, and the processor and the charger determine the total charging current, that is, the charging current of the battery, according to the preset charging protocol. The above preset charging protocols may include but are not limited to Quick Charge protocol, Pump Express protocol, PD fast charging protocol, etc. Skilled persons may select the charging protocol between the electronic equipment and the charger according to specific scenarios. In the condition that the processor may determine the total charging current, the corresponding solutions falls within the protection scope of the present disclosure.

In this embodiment, after determining the total charging current I, the processor may determine the branch current $$\frac{K}{K+1}$$

in the first charging path and the branch current $$\frac{1}{K+1}I$$

in the second charging path based on the current coefficient and the total charging current. That is, the total charging current is the sum of the branch current of the first charging path and the branch current of the second charging path.

In step 34, each charging path is controlled to charge the battery based on the branch current of each charging path. In this embodiment, after the branch current of each charging path is determined, the processor may communicate with the charging chips in the first charging path and the second charging path respectively, and send the branch current of each charging path to the charging chip, to enable the charging chip to adjust the charging current of the corresponding charging path to the corresponding branch current. In this way, the charging path with a higher temperature in this embodiment may be charged with a smaller current, while the path with a lower temperature may be charged with a larger current, so as to achieve balanced charging of each charging path. In other words, in this embodiment, it may be ensured that the battery is in a high-power charging state by making full use of the heat dissipation allowance of each charging path.

In an embodiment, the processor may adjust the branch current of each charging path periodically. That is, after the processor controls each charging path to charge the battery with the branch current for a preset duration, step 31 is re-executed to achieve the effect of adjusting the branch current periodically. The above preset duration ranges from 1 s to 120 s, which can be selected according to specific scenarios. In an example, the above preset duration is 10 s, and the preset duration may also be set to other durations, such as 8 s or 15 s.

So far, in the solutions provided by the embodiment of the present disclosure the temperature value corresponding to each of the at least two charging paths may be obtained. Then, the current coefficient is obtained based on the temperature value corresponding to each charging path. The current coefficient is configured to determine the branch current of each charging path. Then, the branch current in each charging path is determined based on the current coefficient and the total charging current of the electronic equipment; Finally, each charging path is controlled to charge the battery based on the branch current of each charging path. In this way, in this embodiment, the current coefficient and the branch current of each charging path are determined based on the temperature value of each charging path, so that each charging path is enabled to generate heat evenly during the charging process to avoid the problem of excessive temperature difference between charging paths, so as to ensure that the battery is in a high-power charging state, which is conducive to improving the charging efficiency.

Figure 6:
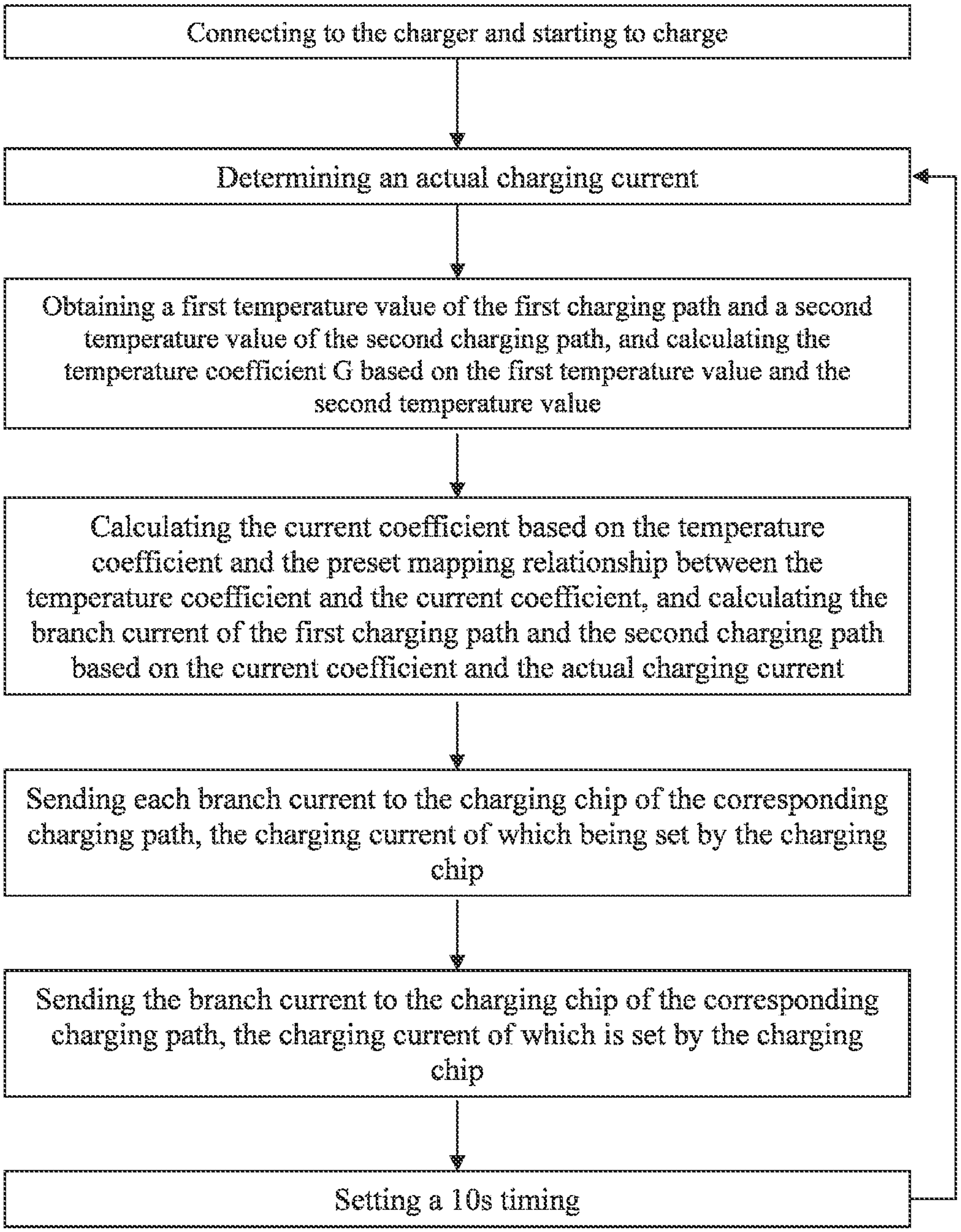
FIG. 6 is a flowchart of a charging method according to an embodiment.

A charging method provided by the present disclosure is described below in combination with FIG. 6. Refer to FIG. 6, the charging method includes:

After the processor detects that the external charger is connected, the processor and the charger complete the preparation for charging according to the requirements of the preset protocol, and start charging after the preparation is completed. During the charging process, the processor may determine the total charging current of the electronic equipment and obtain the current first temperature value of the first charging path and the current second temperature value of the second charging path. Then, the processor may calculate the temperature coefficient G based on the first temperature value and the second temperature value. Then, the processor may calculate the current coefficient K based on the preset mapping relationship $$K = \frac{1}{GP}$$

between the temperature coefficient and the current coefficient.

The processor may calculate the branch current $$\frac{K}{K+1}I$$

of the first charging path and the branch current $$\frac{1}{K+1}I$$

of the second charging path based on the current coefficient and the total charging current. It should be understood that the above two branch currents are the current values that minimize the heat generated by the electronic equipment during the current charging process.

In practical application, the first charging path and the second charging path are provided with a charging chip respectively, which may obtain the branch current sent by the processor and control the charging path to output the corresponding branch current. That is, the processor may communicate with the charging chips in the first charging path and the second charging path respectively, so that the charging chip is enabled to adjust the current of the charging path to the corresponding branch current. At the same time, the processor starts the timer.

When it is detected that the timer is timed to 10 s, the processor repeats the above process until the battery charging is completed.

Figure 7:
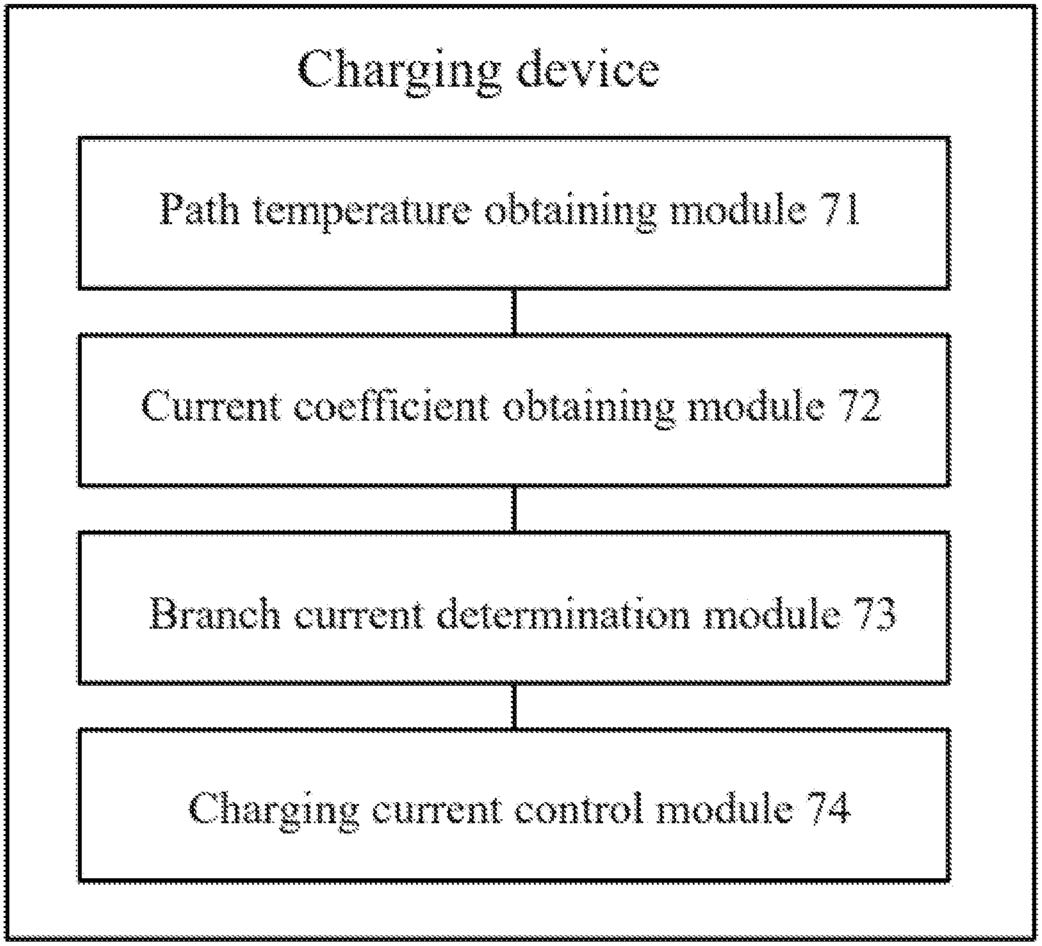
FIG. 7 is a block diagram of a charging device according to an embodiment.

On the basis of the charging method provided by the embodiment of the present disclosure, the embodiment of the present disclosure also provides a charging device applied to an electronic equipment provided with at least two charging paths to charge a battery. Referring to FIG. 7, the charging device includes:

- a path temperature obtaining module 71, configured to obtain a temperature value corresponding to each of the at least two charging paths;
- a current coefficient obtaining module 72, configured to obtain a current coefficient based on the temperature value corresponding to each charging path;
- a branch current determination module 73, configured to determine a branch current in each charging path based on the current coefficient and a total charging current of the electronic equipment;
- a charging current control module 74, configured to controlling each charging path to charge the battery correspondingly based on the branch current of each charging path.

Alternatively, in the condition that the electronic equipment includes a first charging path and a second charging path, the current coefficient obtaining module includes:

- a temperature coefficient obtaining submodule, configured to obtain a temperature coefficient based on a first temperature value corresponding to the first charging path and a second temperature value corresponding to the second charging path, where the temperature coefficient represents a proportional value of the first temperature value and the second temperature value;
- a current coefficient obtaining submodule, configured to obtain the current coefficient based on the temperature coefficient and a preset mapping relationship between the temperature coefficient and the current coefficient.

Alternatively, the charging device further includes a mapping relationship obtaining module configured to obtain the preset mapping relationship between the temperature coefficient and the current coefficient; where the mapping relationship obtaining module includes:

- a path model obtaining submodule, configured to determine a first thermal model of the first charging path and a second thermal model of the second charging path;
- a thermal model obtaining submodule, configured to determine a total thermal model corresponding to charging of the electronic equipment based on the first thermal model and the second thermal model;
- a mapping relationship obtaining submodule, configured to obtain the preset mapping relationship between the temperature coefficient and the current coefficient based on the total thermal model.

Alternatively, the path model obtaining submodule includes:

- an impedance value obtaining unit, configured to obtain a first impedance value of the first charging path and a second impedance value of the second charging path;
- a path current obtaining unit, configured to determine a first current of the first charging path and a second current of the second charging path based on the total charging current;
- a path model obtaining unit, configured to determine the first thermal model of the first charging path based on the temperature coefficient, the first impedance value and the first current, and to determine the second thermal model of the second charging path based on the second impedance value and the second current.

Alternatively, the mapping relationship obtaining submodule includes:

- a minimum value obtaining unit, configured to determine a minimum thermal value of the electronic equipment in a charged state based on the total thermal model;
- a mapping relationship obtaining unit, configured to determine the preset mapping relationship between the temperature coefficient and the current coefficient based on the minimum thermal value.

Alternatively, the branch current determination module includes:

- an actual current determination submodule, configured to determine the total charging current;
- a branch current determination submodule, configured to determine a first branch current of the first charging path and a second branch current of the second charging path respectively based on the current coefficient and the total charging current.

Alternatively, the charging device further includes:

- a cycle iteration module, configured to send a trigger signal to the path temperature obtaining module after charging the battery based on the branch current for a preset duration, to enable the path temperature obtaining module to re-execute the step of obtaining the temperature value corresponding to each of the at least two charging paths, which is applied to an electronic equipment provided with at least two charging paths to charge the battery. The device includes:
- a path temperature obtaining module, configured to obtain a temperature value corresponding to each of the at least two charging paths;

- a current coefficient obtaining module, configured to obtain a current coefficient based on the temperature value corresponding to each charging path;
- a branch current determination module, configured to determine a branch current in each charging path based on the current coefficient and a total charging current of the electronic equipment;
- a charging current control module, configured to controlling each charging path to charge the battery correspondingly based on the branch current of each charging path.

Alternatively, in the condition that the electronic equipment includes a first charging path and a second charging path, the current coefficient obtaining module includes:

- a temperature coefficient obtaining submodule, configured to obtain a temperature coefficient based on to a first temperature value corresponding to the first charging path and a second temperature value corresponding to the second charging path, where the temperature coefficient represents a proportional value of the first temperature value and the second temperature value;
- a current coefficient obtaining submodule, configured to obtain the current coefficient based on the temperature coefficient and a preset mapping relationship between the temperature coefficient and the current coefficient.

Alternatively, the charging device further includes a mapping relationship obtaining module configured to obtain the preset mapping relationship between the temperature coefficient and the current coefficient; where the mapping relationship obtaining module includes:

- a path model obtaining submodule, configured to determine a first thermal model of the first charging path and a second thermal model of the second charging path;
- a thermal model obtaining submodule, configured to determine a total thermal model corresponding to charging of the electronic equipment based on the first thermal model and the second thermal model;
- a mapping relationship obtaining submodule, configured to obtain the preset mapping relationship between the temperature coefficient and the current coefficient based on the total thermal model.

Alternatively, the path model obtaining submodule includes:

- an impedance value obtaining unit, configured to obtain a first impedance value of the first charging path and a second impedance value of the second charging path;
- a path current obtaining unit, configured to determine a first current of the first charging path and a second current of the second charging path based on the total charging current;
- a path model obtaining unit, configured to determine the first thermal model of the first charging path based on the temperature coefficient, the first impedance value and the first current, and to determine the second thermal model of the second charging path based on the second impedance value and the second current.

Alternatively, the mapping relationship obtaining submodule includes:

- a minimum value obtaining unit, configured to determine a minimum thermal value of the electronic equipment in a charged state based on the total thermal model;
- a mapping relationship obtaining unit, configured to determine the preset mapping relationship between the temperature coefficient and the current coefficient based on the minimum thermal value.

Alternatively, the branch current determination module includes:

- an actual current determination submodule, configured to determine the total charging current;
- a branch current determination submodule, configured to determine a first branch current of the first charging path and a second branch current of the second charging path respectively based on the current coefficient and the total charging current.

Alternatively, the charging device further includes:

- a cycle iteration module, configured to send a trigger signal to the path temperature obtaining module after charging the battery based on the branch current for a preset duration, to enable the path temperature obtaining module to re-execute the step of obtaining the temperature value corresponding to each of the at least two charging paths.

It should be noted that the content of the device illustrated in the present embodiment matches that of the method embodiment, which may refer to the content of the above method embodiment and will not be repeated here.

Figure 8:
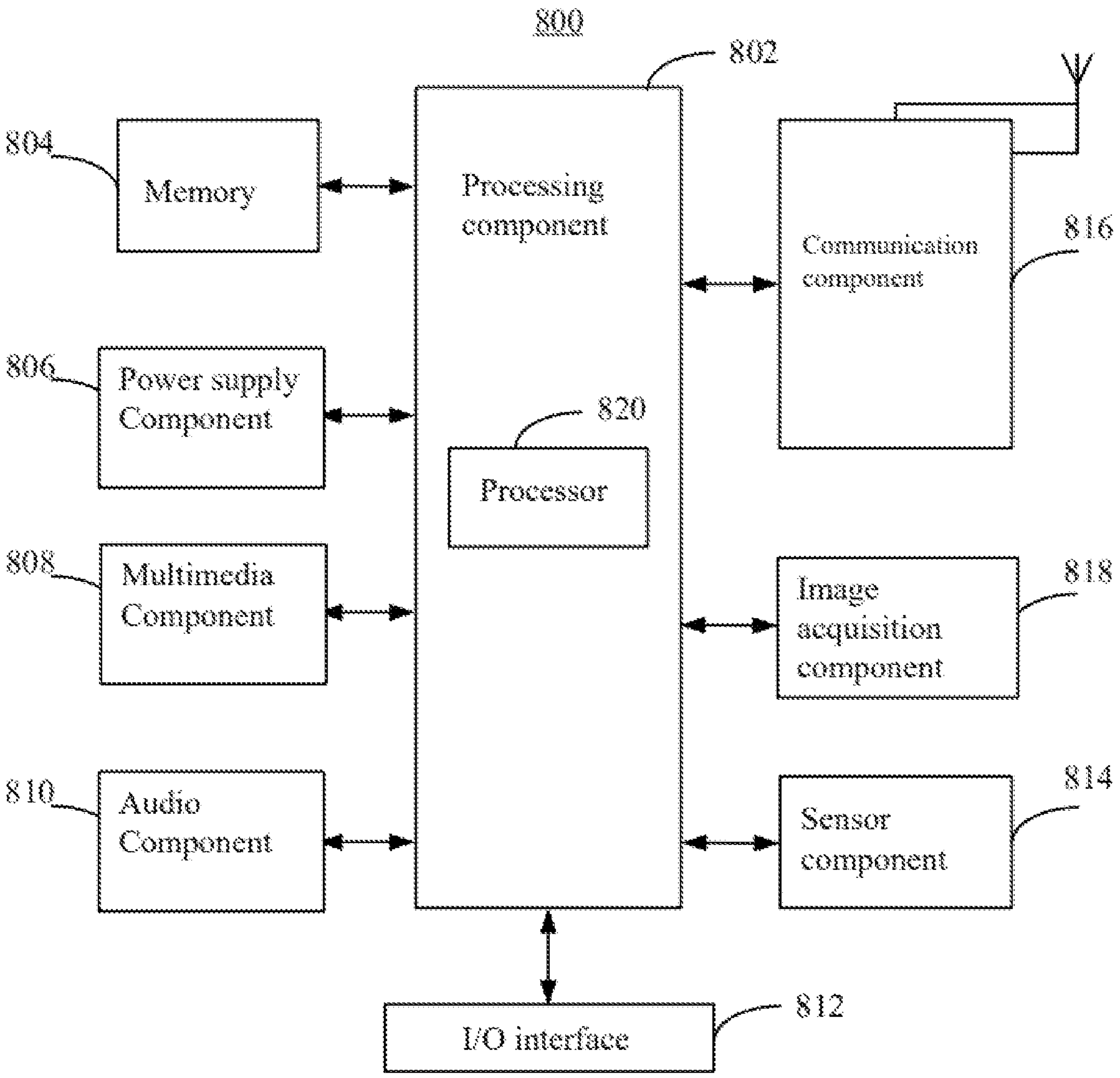
FIG. 8 is a block diagram of an electronic equipment according to an embodiment.

FIG. 8 is a block diagram of an electronic equipment according to an exemplary embodiment. For example, the electronic equipment 800 may be a smart phone, a computer, a digital broadcasting terminal, a tablet device, a medical device, a fitness device, and a personal digital assistant, etc.

Referring to FIG. 8, the electronic equipment 800 may include one or more of the following components: a processing component 802, a memory 804, a power supply component 806, a multimedia component 808, an audio component 810, an input/output (I/O) interface 812, a sensor component 814, a communication component 816, and an image acquisition component 818.

The processing component 802 typically controls the overall operation of the electronic equipment 800, such as operations associated with display, telephone calls, data communications, camera operations, and recording operations. The processing component 802 may include one or more processors 820 to execute computer programs. Further, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the electronic equipment 800. Examples of such data include computer programs for any application or method, contact data, phonebook data, messages, pictures, videos, and the like operating on the electronic equipment 800. The memory 804 may be implemented by any type of volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the electronic equipment 800. The power component 806 may include a power management system, one or more power supplies, and other components associated with generating, managing, and distributing power for the electronic equipment 800. The power supply component 806 may include a power chip, and the controller may communicate with the power chip to control the power chip to turn on or the switching device to turn off so that the battery supplies or does not supply power to the motherboard circuit. In an example, the power supply component

806 includes a first charging path, a second charging path, and a charging interface. The processor is connected with the first charging path and the second charging path respectively. The first charging path is connected in series between the charging interface and the battery, and the second charging path is connected in series between the charging interface and the battery. The processor controls the first charging path and the second charging path to charge the battery according to the method shown in FIG. 2.

The multimedia component 808 includes a screen provided with an output interface between the electronic equipment 800 and a target object. In some embodiments, the screen may include a liquid crystal display (LCD) and a touch panel (TP). If the screen includes a touch panel, the screen may be implemented as a touch screen to receive input information from the target object. The touch panel includes one or more touch sensors to sense touching, sliding, and gestures on the touch panel. The touch sensor may not only sense the boundary of the touching or sliding operation, but also detect the duration and pressure related to the touching or sliding operation.

The audio component 810 is configured to output and/or input audio file information. For example, the audio component 810 includes a microphone (MIC) configured to receive external audio file information when the electronic equipment 800 is in an operating mode, such as a call mode, a recording mode, and a speech recognition mode. The received audio file information may be further stored in the memory 804 or transmitted via the communication component 816. In some embodiments, the audio component 810 further includes a speaker for outputting the audio file information.

The I/O interface 812 provides an interface between the processing component 802 and the peripheral interface module, which may be a keyboard, a click wheel, a button, etc.

Sensor component 814 includes one or more sensors for providing various aspects of condition evaluation of the electronic equipment 800. For example, the sensor component 814 may detect the open/close state of the electronic equipment 800, the relative positioning of the components, such as the display screen and keypad of the electronic equipment 800. The sensor component 814 may further detect the position change of the electronic equipment 800 or a component, the presence or absence of the contact between the target object and the electronic equipment 800, the orientation or acceleration/deceleration of the electronic equipment 800, and the temperature change of the electronic equipment 800. In this example, the sensor component 814 may include a first temperature sensor and a second temperature sensor. The first temperature sensor is arranged within a preset range of the first charging path for collecting the first temperature value corresponding to the first charging path; The second temperature sensor is arranged within a preset range of the second charging path to collect the second temperature value corresponding to the second charging path. The above preset range may be 1~20 mm. In an example, the above preset range may be taken as 2~5 mm.

The communication component 816 is configured to facilitate wired or wireless communication between the electronic equipment 800 and other devices. The electronic equipment 800 may access a wireless network based on a communication standard, such as WiFi, 2G, 3G, 4G, 5g, or a combination thereof. In an exemplary embodiment, the communication component 816 receives broadcast information or broadcast related information from an external broadcast management system via a broadcast channel. In an exemplary embodiment, the communication component 816 further includes a near field communication (NFC) module to facilitate short-range communication. For example, the NFC module may be implemented based on radio frequency identification (RFID) technology, infrared data association (IrDA) technology, ultra wideband (UWB) technology, bluetooth (BT) technology and other technologies.

In an exemplary embodiment, the electronic equipment 800 may be implemented by one or more application specific integrated circuits (ASICs), digital information processors (DSPS), digital information processing devices (DSPD), programmable logic devices (PLD), field programmable gate arrays (FPGA), controllers, microcontrollers, microprocessors, or other electronic components.

In an exemplary embodiment, a non-transitory computer-readable storage medium, such as a memory 804 containing instructions, is further provided, and the above executable computer programs may be executed by a processor. The readable storage medium may be ROM, random access memory (RAM), CD-ROM, magnetic tape, floppy disk, optical data storage device, etc.

After considering the description and practicing the disclosure disclosed herein, it is easy for those skilled in the art to think of other embodiments of the disclosure. The present disclosure is intended to cover any variation, change of use or adaptability, which follows the general principles of the present disclosure and includes common general knowledge or conventional technical means in the art not disclosed in the present disclosure. The description and the embodiments are regarded as exemplary only, with the true scope and spirit of the present disclosure being indicated by the following claims.

It should be understood that the present disclosure is not limited to the precise structure described above and illustrated in the accompanying drawings, and that various modifications and changes may be made without departing from the scope thereof. The scope of the present disclosure is limited only by the appended claims.

The present disclosure provides a charging method and device, an electronic equipment, and a non-transitory readable storage medium to overcome the shortage of related technologies.

According to a first aspect of the embodiments of the present disclosure, provided is a charging method applied to an electronic equipment provided with at least two charging paths to charge a battery, including:

obtaining a temperature value corresponding to each of the at least two charging paths;

obtaining a current coefficient based on the temperature value corresponding to each charging path;

determining a branch current in each charging path based on the current coefficient and a total charging current of the electronic equipment;

controlling each charging path to charge the battery correspondingly based on the branch current of each charging path.

Alternatively, in the condition that the electronic equipment includes a first charging path and a second charging path, obtaining the current coefficient based on the temperature value corresponding to each charging path includes:

obtaining a temperature coefficient based on a first temperature value corresponding to the first charging path and a second temperature value corresponding to the second charging path, where the temperature coefficient represents a proportional value of the first temperature value and the second temperature value;

obtaining the current coefficient based on the temperature coefficient and a preset mapping relationship between the temperature coefficient and the current coefficient.

Alternatively, obtaining the preset mapping relationship between the temperature coefficient and the current coefficient includes:

determining a first thermal model of the first charging path and a second thermal model of the second charging path;

determining a total thermal model corresponding to charging of the electronic equipment based on the first thermal model and the second thermal model;

obtaining the preset mapping relationship between the temperature coefficient and the current coefficient based on the total thermal model.

Alternatively, determining the first thermal model of the first charging path and the second thermal model of the second charging path includes:

obtaining a first impedance value of the first charging path and a second impedance value of the second charging path;

determining a first current of the first charging path and a second current of the second charging path based on the total charging current;

determining the first thermal model of the first charging path based on the temperature coefficient, the first impedance value and the first current, and determining the second thermal model of the second charging path based on the second impedance value and the second current.

Alternatively, obtaining the preset mapping relationship between the temperature coefficient and the current coefficient based on the total thermal model includes:

determining a minimum thermal value of the electronic equipment in a charged state based on the total thermal model;

determining the preset mapping relationship between the temperature coefficient and the current coefficient based on the minimum thermal value.

Alternatively, determining the branch current in each charging path based on the current coefficient and the total charging current of the electronic equipment includes:

determining the total charging current of the electronic equipment;

determining a first branch current of the first charging path and a second branch current of the second charging path respectively based on the current coefficient and the total charging current.

Alternatively, the charging method further includes:

re-executing the step of obtaining the temperature value corresponding to each of the at least two charging paths, after charging the battery based on the branch current for a preset duration.

According to a second aspect of the embodiments of the present disclosure, provided is a charging device applied to an electronic equipment provided with at least two charging paths to charge a battery, including:

a path temperature obtaining module, configured to obtain a temperature value corresponding to each of the at least two charging paths;

a current coefficient obtaining module, configured to obtain a current coefficient based on the temperature value corresponding to each charging path;

a branch current determination module, configured to determine a branch current in each charging path based on the current coefficient and a total charging current of the electronic equipment;

a charging current control module configured to controlling each charging path to charge the battery correspondingly based on the branch current of each charging path.

Alternatively, in the condition that the electronic equipment includes a first charging path and a second charging path, the current coefficient obtaining module includes:

a temperature coefficient obtaining submodule, configured to obtain a temperature coefficient based on a first temperature value corresponding to the first charging path and a second temperature value corresponding to the second charging path, where the temperature coefficient represents a proportional value of the first temperature value and the second temperature value;

a current coefficient obtaining submodule, configured to obtain the current coefficient based on the temperature coefficient and a preset mapping relationship between the temperature coefficient and the current coefficient.

Alternatively, the charging device further includes a mapping relationship obtaining module configured to obtain the preset mapping relationship between the temperature coefficient and the current coefficient; where the mapping relationship obtaining module includes:

a path model obtaining submodule, configured to determine a first thermal model of the first charging path and a second thermal model of the second charging path;

a thermal model obtaining submodule, configured to determine a total thermal model corresponding to charging of the electronic equipment based on the first thermal model and the second thermal model;

a mapping relationship obtaining submodule, configured to obtain the preset mapping relationship between the temperature coefficient and the current coefficient based on the total thermal model.

Alternatively, the path model obtaining submodule includes:

an impedance value obtaining unit, configured to obtain a first impedance value of the first charging path and a second impedance value of the second charging path;

a path current obtaining unit, configured to determine a first current of the first charging path and a second current of the second charging path based on the total charging current;

a path model obtaining unit, configured to determine the first thermal model of the first charging path based on the temperature coefficient, the first impedance value and the first current, and to determine the second thermal model of the second charging path based on the second impedance value and the second current.

Alternatively, the mapping relationship obtaining submodule includes:

a minimum value obtaining unit, configured to determine a minimum thermal value of the electronic equipment in a charged state based on the total thermal model;

a mapping relationship obtaining unit, configured to determine the preset mapping relationship between the temperature coefficient and the current coefficient based on the minimum thermal value.

Alternatively, the branch current determination module includes:

an actual current determination submodule, configured to determine the total charging current;

a branch current determination submodule, configured to determine a first branch current of the first charging path and a second branch current of the second charging path respectively based on the current coefficient and the total charging current.

Alternatively, the charging device further includes:

a cycle iteration module, configured to send a trigger signal to the path temperature obtaining module after charging the battery based on the branch current for a preset duration, to enable the path temperature obtaining module to re-execute the step of obtaining the temperature value corresponding to each of the at least two charging paths According to a third aspect of the embodiments of the present disclosure, provided is an electronic equipment including a memory and a processor; wherein, the memory is configured to store computer programs executable by the processor;

the processor is configured to execute the computer programs stored in the memory to implement the above methods.

Alternatively, the electronic equipment further includes a first charging path, a second charging path, a charging interface and a battery; wherein, the processor is connected with the first charging path and the second charging path respectively;

the first charging path is connected in series between the charging interface and the battery;

the second charging path is connected in series between the charging interface and the battery.

According to a fourth aspect of the embodiments of the present disclosure, provided is a non-transitory computer readable storage medium, wherein, in the condition that the executable computer programs in the storage medium are executed by a processor, the above methods are implemented.

The technical solutions provided by the embodiments of the present disclosure may include the following beneficial effects:

It can be seen from the above embodiments that, in the solutions provided by the embodiments of the present disclosure, the temperature value corresponding to each of the at least two charging paths is obtained; then, the current coefficient configured to determine the branch current of each charging path is obtained based on the temperature value corresponding to each charging path; after that, the branch current in each charging path is determined based on the current coefficient and the total charging current; finally, each charging path is controlled to charge the battery based on the branch current of each charging path. In this way, the current coefficient and the branch current of each charging path in the embodiments are determined based on the temperature value of each charging path, to enable each charging path to generate heat evenly during the charging process to avoid the problem of excessive temperature difference between charging paths, so as to ensure that the battery is in a high-power charging state, which is conducive to improving the charging efficiency.

The invention claimed is:

1. A charging method applied to an electronic equipment provided with at least two charging paths to charge a battery, comprising:

obtaining a temperature value corresponding to a charging path of the at least two charging paths, wherein branch currents of the at least two charging paths are able to be adjusted;

obtaining a current coefficient based on the temperature value corresponding to the charging path;

determining a branch current in the charging path based on the current coefficient and a total charging current of the electronic equipment, wherein the total charging current is a sum of the branch currents of the at least two charging paths; and controlling the charging path to charge the battery correspondingly based on the branch current of the charging path;

wherein, the electronic equipment comprises a first charging path and a second charging path, and the obtaining the current coefficient based on the temperature value corresponding to the charging path comprises:

obtaining a temperature coefficient based on a first temperature value corresponding to the first charging path and a second temperature value corresponding to the second charging path, wherein the temperature coefficient represents a proportional value of the first temperature value and the second temperature value; and obtaining the current coefficient based on the temperature coefficient and a preset mapping relationship between the temperature coefficient and the current coefficient.

2. The charging method according to claim 1, further comprising:

determining a first thermal model of the first charging path and a second thermal model of the second charging path;

determining a total thermal model corresponding to charging of the electronic equipment based on the first thermal model and the second thermal model; and obtaining the preset mapping relationship between the temperature coefficient and the current coefficient based on the total thermal model.

3. The charging method according to claim 2, wherein the determining the first thermal model of the first charging path and the second thermal model of the second charging path further comprises:

obtaining a first impedance value of the first charging path and a second impedance value of the second charging path;

determining a first current of the first charging path and a second current of the second charging path based on the total charging current; and determining the first thermal model of the first charging path based on the temperature coefficient, the first impedance value and the first current, and determining the second thermal model of the second charging path based on the second impedance value and the second current.

4. The charging method according to claim 2, wherein the obtaining the preset mapping relationship between the temperature coefficient and the current coefficient based on the total thermal model further comprises:

determining a minimum thermal value of the electronic equipment in a charged state based on the total thermal model; and determining the preset mapping relationship between the temperature coefficient and the current coefficient based on the minimum thermal value.

5. The charging method according to claim 1, further comprising:

re-obtaining the temperature value corresponding to the charging path of the at least two charging paths, in response to determining that the battery has been charged based on the branch current for a preset duration.

6. An electronic equipment, provided with at least two charging paths, comprising:

a memory; and a processor, wherein:

the memory is configured to store computer programs executable by the processor;

the processor is configured to perform following functions:

obtaining a temperature value corresponding to a charging path of the at least two charging paths, wherein branch currents of the at least two charging paths are able to be adjusted;

obtaining a current coefficient based on the temperature value corresponding to the charging path;

determining a branch current in the charging path based on the current coefficient and a total charging current of the electronic equipment, wherein the total charging current is a sum of the branch currents of the at least two charging paths; and controlling the charging path to charge a battery correspondingly based on the branch current of the charging path;

wherein the electronic equipment further comprises a charging interface and the battery, the at least two charging paths comprises a first charging path and a second charging path, the processor is connected with the first charging path and the second charging path respectively. the first charging path is connected in series between the charging interface and the battery. and the second charging path is connected in series between the charging interface and the battery.

7. The electronic equipment according to claim 6, wherein the obtaining the current coefficient based on the temperature value corresponding to the charging path further comprises:

obtaining a temperature coefficient based on a first temperature value corresponding to the first charging path and a second temperature value corresponding to the second charging path, wherein the temperature coefficient represents a proportional value of the first temperature value and the second temperature value; and obtaining the current coefficient based on the temperature coefficient and a preset mapping relationship between the temperature coefficient and the current coefficient.

8. The electronic equipment according to claim 7, wherein the processor is further configured to perform following functions:

determining a first thermal model of the first charging path and a second thermal model of the second charging path;

determining a total thermal model corresponding to charging of the electronic equipment based on the first thermal model and the second thermal model; and obtaining the preset mapping relationship between the temperature coefficient and the current coefficient based on the total thermal model.

9. The electronic equipment according to claim 8, wherein the determining the first thermal model of the first charging path and the second thermal model of the second charging path further comprises:

obtaining a first impedance value of the first charging path and a second impedance value of the second charging path;

determining a first current of the first charging path and a second current of the second charging path based on the total charging current; and determining the first thermal model of the first charging path based on the temperature coefficient, the first impedance value and the first current, and determining the second thermal model of the second charging path based on the second impedance value and the second current.

10. The electronic equipment according to claim 8, wherein the obtaining the preset mapping relationship between the temperature coefficient and the current coefficient based on the total thermal model further comprises:

determining a minimum thermal value of the electronic equipment in a charged state based on the total thermal model; and determining the preset mapping relationship between the temperature coefficient and the current coefficient based on the minimum thermal value.

11. The electronic equipment according to claim 6, wherein, the processor is further configured to perform following function:

re-obtaining the temperature value corresponding to the charging path of the at least two charging paths, in response to determining that the battery has been charged based on the branch current for a preset duration.

12. A non-transitory computer readable storage medium, wherein executable computer programs in a storage medium are executed by a processor to implement operations, comprising:

obtaining a temperature value corresponding to a charging path of at least two charging paths, wherein branch currents of the at least two charging paths are able to be adjusted;

obtaining a current coefficient based on the temperature value corresponding to the charging path;

determining a branch current in the charging path based on the current coefficient and a total charging current of an electronic equipment, wherein the total charging current is a sum of the branch currents of the at least two charging paths; and controlling the charging path to charge a battery correspondingly based on the branch current of the charging path;

wherein the at least two charging paths comprises a first charging path and a second charging path, and the obtaining the current coefficient based on the temperature value corresponding to the charging path further comprises:

obtaining a temperature coefficient based on a first temperature value corresponding to the first charging path and a second temperature value corresponding to the second charging path, wherein the temperature coefficient represents a proportional value of the first temperature value and the second temperature value:

obtaining the current coefficient based on the temperature coefficient and a preset mapping relationship between the temperature coefficient and the current coefficient.

13. The non-transitory computer readable storage medium according to claim 12, wherein the executable computer programs in the storage medium are executed by the processor to implement operations, further comprising:

determining a first thermal model of the first charging path and a second thermal model of the second charging path;

determining a total thermal model corresponding to charging of the electronic equipment based on the first thermal model and the second thermal model; and obtaining the preset mapping relationship between the temperature coefficient and the current coefficient based on the total thermal model.

14. The non-transitory computer readable storage medium according to claim 13, wherein the determining the first thermal model of the first charging path and the second thermal model of the second charging path further comprises:

obtaining a first impedance value of the first charging path and a second impedance value of the second charging path;

determining a first current of the first charging path and a second current of the second charging path based on the total charging current; and determining the first thermal model of the first charging path based on the temperature coefficient, the first impedance value and the first current, and determining the second thermal model of the second charging path based on the second impedance value and the second current.

15. The non-transitory computer readable storage medium according to claim 13, wherein the obtaining the preset mapping relationship between the temperature coefficient and the current coefficient based on the total thermal model further comprises:

determining a minimum thermal value of the electronic equipment in a charged state based on the total thermal model; and determining the preset mapping relationship between the temperature coefficient and the current coefficient based on the minimum thermal value.

16. The non-transitory computer readable storage medium according to claim 12, wherein the determining the branch current in the charging path based on the current coefficient and the total charging current of the electronic equipment further comprises:

determining the total charging current of the electronic equipment; and determining a first branch current of the first charging path and a second branch current of the second charging path respectively based on the current coefficient and the total charging current.

17. The non-transitory computer readable storage medium according to claim 12, wherein the executable computer programs in the storage medium are executed by the processor to implement operations further comprising:

re-obtaining the temperature value corresponding to the charging path of the at least two charging paths, in response to determining that the battery has been charged based on the branch current for a preset duration.

* * * * *